US009879548B2

(12) United States Patent
Annaluri et al.

(10) Patent No.: US 9,879,548 B2
(45) Date of Patent: Jan. 30, 2018

(54) TURBINE BLADE DAMPER SYSTEM HAVING PIN WITH SLOTS

(71) Applicant: General Electric Company, Schenectday, NY (US)

(72) Inventors: Srikeerthi Annaluri, Bangalore (IN); Thangaraj Subbareddyar, Oddanchatram (IN)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 14/823,604

(22) Filed: Aug. 11, 2015

(65) Prior Publication Data

US 2016/0333704 A1 Nov. 17, 2016

(51) Int. Cl.

| | |
|---|---|
| ***F01D 5/10*** | (2006.01) |
| ***F01D 5/22*** | (2006.01) |
| ***F01D 5/16*** | (2006.01) |

(52) U.S. Cl.

CPC ................. *F01D 5/22* (2013.01); *F01D 5/16* (2013.01); *F05D 2240/30* (2013.01); *F05D 2240/80* (2013.01); *F05D 2250/182* (2013.01); *F05D 2250/294* (2013.01); *F05D 2260/96* (2013.01); *Y02T 50/67* (2013.01)

(58) Field of Classification Search

CPC .......... F01D 5/16; F01D 5/22; F05D 2240/80; F05D 2260/96

See application file for complete search history.

(56) References Cited

U.S. PATENT DOCUMENTS

| | | | | |
|---|---|---|---|---|
| 4,936,749 A * | 6/1990 | Arrao | F01D 5/22 416/190 |
| 5,827,047 A | 10/1998 | Gonsor et al. | |
| 6,851,932 B2 * | 2/2005 | Lagrange | F01D 5/22 416/190 |
| 7,163,376 B2 | 1/2007 | Itzel et al. | |
| 8,790,086 B2 * | 7/2014 | Honkomp | F01D 11/006 416/190 |
| 2010/0124508 A1 | 5/2010 | Liang | |
| 2012/0237348 A1 * | 9/2012 | Thomen | F01D 5/22 416/196 R |
| 2012/0237350 A1 | 9/2012 | Corcoran et al. | |
| 2014/0147276 A1 * | 5/2014 | Roberts, III | F01D 5/284 416/135 |

FOREIGN PATENT DOCUMENTS

| | | |
|---|---|---|
| EP | 1 452 692 A2 | 9/2004 |
| EP | 2 110 515 A2 | 10/2009 |
| EP | 2 738 353 A2 | 6/2014 |
| JP | H07-305602 A | 11/1995 |

OTHER PUBLICATIONS

Extended European Search Report and Opinion issued in connection with corresponding EP Application No. 16168466.7 dated Sep. 23, 2016.

* cited by examiner

*Primary Examiner* — Ninh H Nguyen

(74) *Attorney, Agent, or Firm* — Dale Davis; Hoffman Warnick LLC

(57) ABSTRACT

A damper system for a turbine having adjacent turbine bucket platforms including opposing slash faces having opposing grooves is provided. The system includes a pin having a substantially cylindrical-shaped body configured for positioning in the opposing grooves. A set of slots are provided in an outer surface of the pin and at spaced axial locations therealong. The set of slots face in a radially outward direction relative to the turbine bucket platforms.

23 Claims, 6 Drawing Sheets

TURBINE BLADE DAMPER SYSTEM HAVING PIN WITH SLOTS

BACKGROUND OF THE INVENTION

The disclosure relates to a damper system with a damper pin with slots for disposition between adjacent slash faces of turbine bucket platforms for dampening bucket vibrations thereof to meet part life requirements.

Industrial turbines such as gas turbines have trended towards increased inlet firing temperatures and increased power output. As output has increased, gas path temperatures and operational vibrations have increased. Consequently, bucket platform slash faces have increasingly exhibited distress including oxidation, creep and low cycle fatigue cracking Distress of the bucket platform slash faces can damage the platform and cause loss of dampening leading to damage such as compressor discharge flow leakage leading to reduced engine efficiency.

Current turbine arrangements employ damper pins between the slash faces to dampen vibrations. Most current pins have a uniform exterior surface that engage the slash faces of turbine platforms along a line. One approach to provide cooling and some dampening employs a generally cylindrical-shaped pin having a plurality of channels formed therealong for communicating a cooling medium through the channels. The channels extend along opposite sides of the pin and are staggered. While the layout of channels in the current approach provides cooling, it may not provide adequate dampening or dampening customization.

BRIEF DESCRIPTION OF THE INVENTION

A first aspect of the disclosure provides a damper system for a turbine having adjacent turbine bucket platforms including opposing slash faces having opposing grooves, the system comprising: a pin having a substantially cylindrical-shaped body configured for positioning in the opposing grooves; and a set of slots in an outer surface of the pin and at spaced axial locations therealong, the set of slots facing in a radially outward direction relative to the turbine bucket platforms.

A second aspect of the disclosure provides a damper pin for a damper system for a turbine having adjacent turbine bucket platforms having opposing slash faces having opposing grooves, the damper pin comprising: a substantially cylindrical-shaped body configured for positioning in the opposing grooves; and a set of slots in an outer surface of the body at spaced axial locations therealong, the set of slots facing in a radially outward direction relative to the turbine bucket platforms.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a damper system with a damper pin with slots for disposition between adjacent slash faces of turbine bucket platforms for dampening bucket vibrations of turbine bucket platforms required to meet part life requirements. The slots face in a radially outward direction relative to the turbine bucket platforms, and can be customized to provide a desired dampening.

Figure 1:
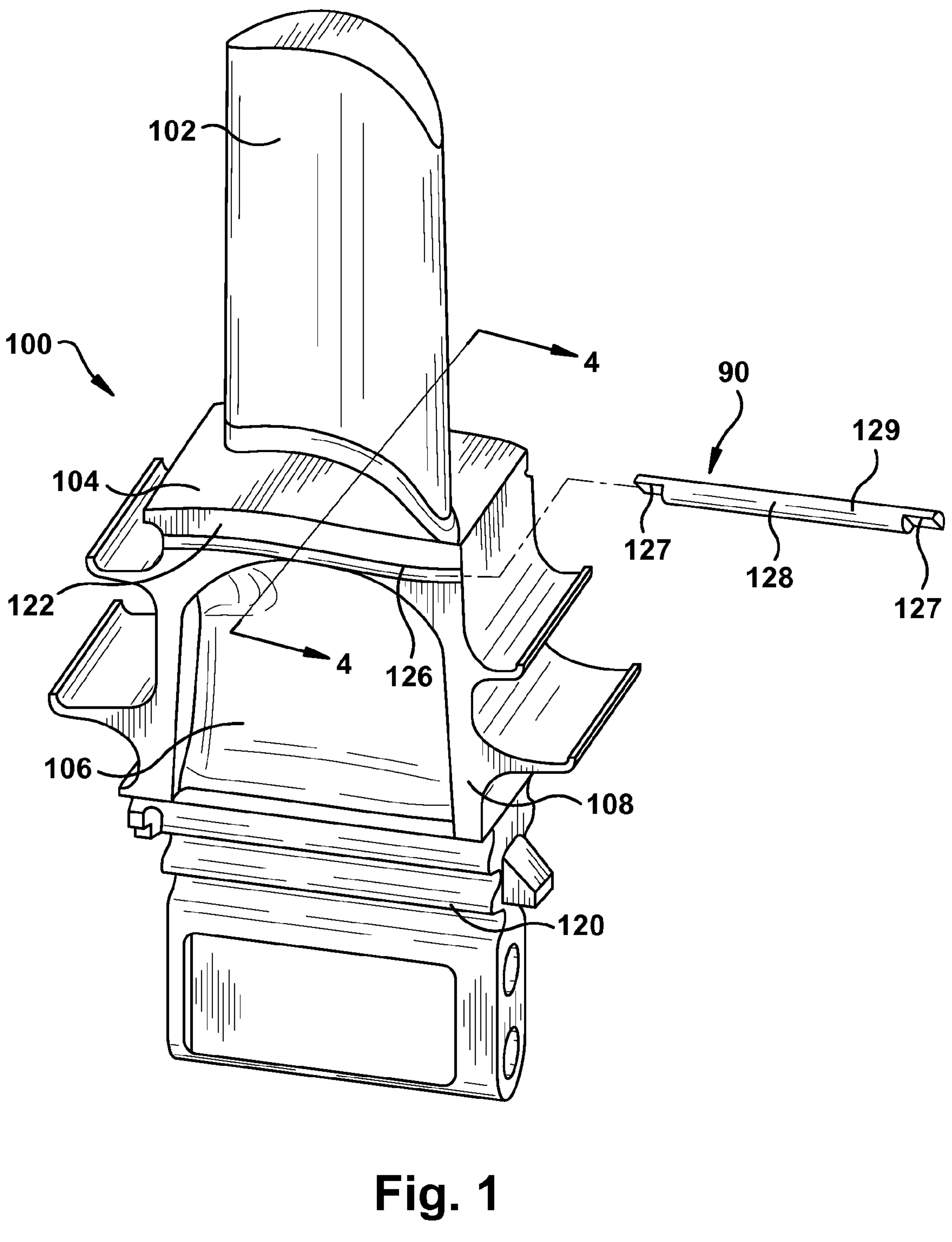
FIG. 1 is a perspective view of a turbine bucket including an airfoil, platform and root, and a dampening system according to embodiments of the invention.
Figure 2:
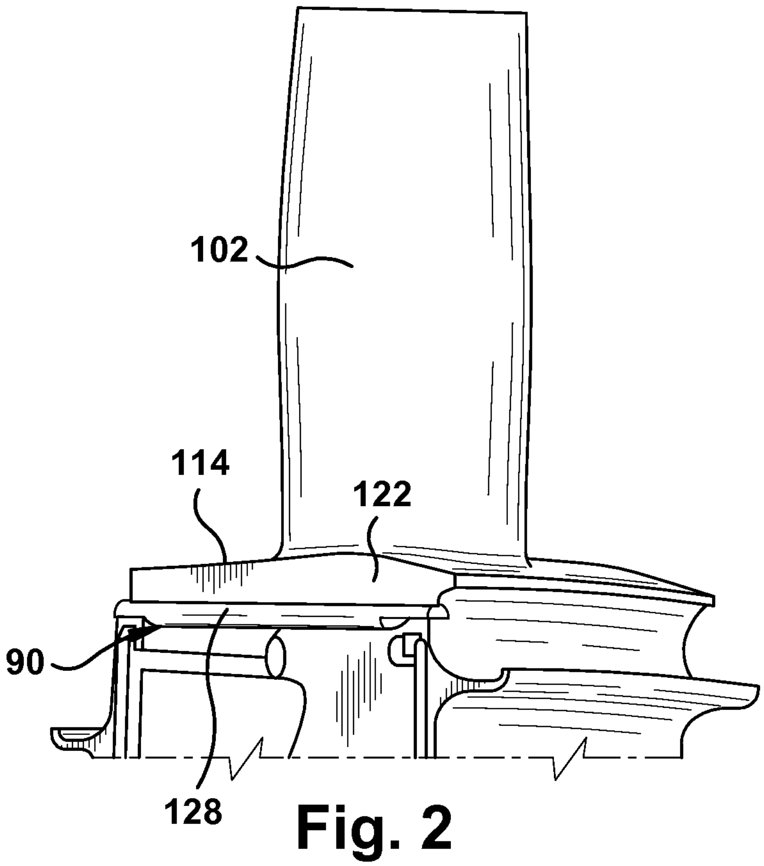
FIG. 2 is a fragmentary perspective view illustrating a damper pin according to embodiments of the invention along a slash face of a turbine bucket platform.
Figure 3:
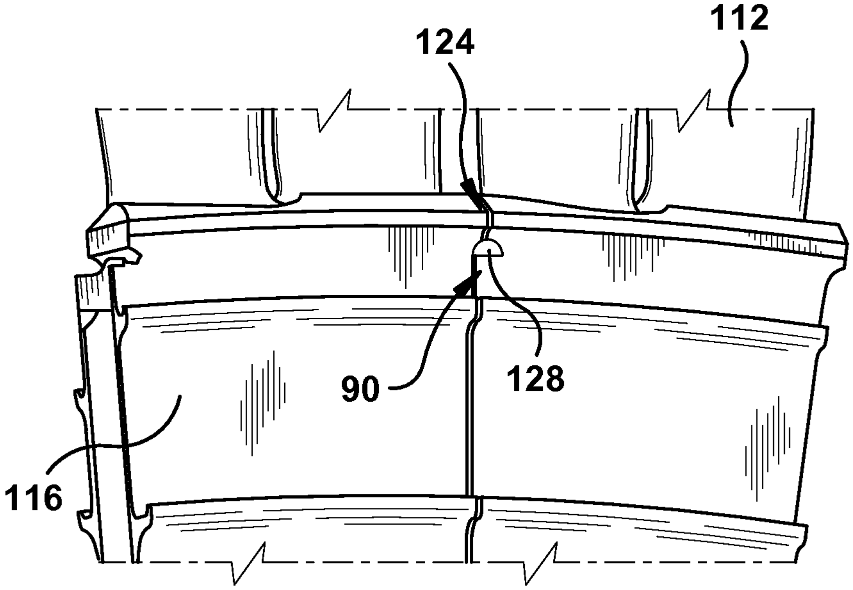
FIG. 3 is an axial end view illustrating a location of a damper pin according to embodiments of the invention between adjacent slash faces.

Referring now to FIG. 1, there is illustrated a damper system 90 for a turbine having adjacent turbine bucket platforms including opposing slash faces having opposing grooves. More specifically, damper system 90 is shown with a turbine bucket generally designated 100 including an airfoil 102, a bucket platform 104, a root portion 106 including a shank 108 and a dovetail 120. It will be appreciated that turbine bucket 100, when placed in a turbine wheel (not shown), is one of an annular array of turbine buckets secured about the periphery of the turbine wheel. While axial entry buckets are disclosed, it will be appreciated that dampening system hereof may be applied to tangential entry buckets. As illustrated best in FIG. 4, adjacent turbine bucket platforms 114 include a gap 124 between slash faces 122 (FIG. 2). As shown in FIGS. 1 and 2, each slash face 122 also includes a portion of a groove 126 (FIGS. 1 and 4) for receiving a damper pin 128.

Figure 16:
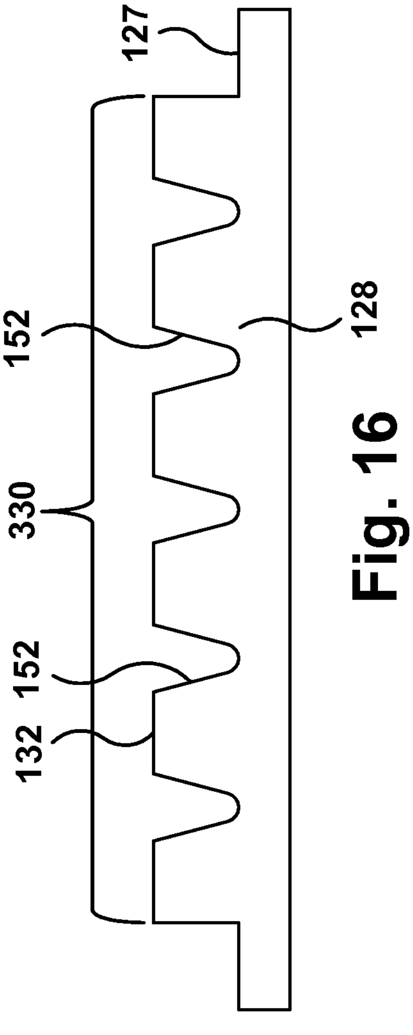
FIGS. 16-17 are side cross-sectional views illustrating other embodiments of a damper pin.
Figure 17:
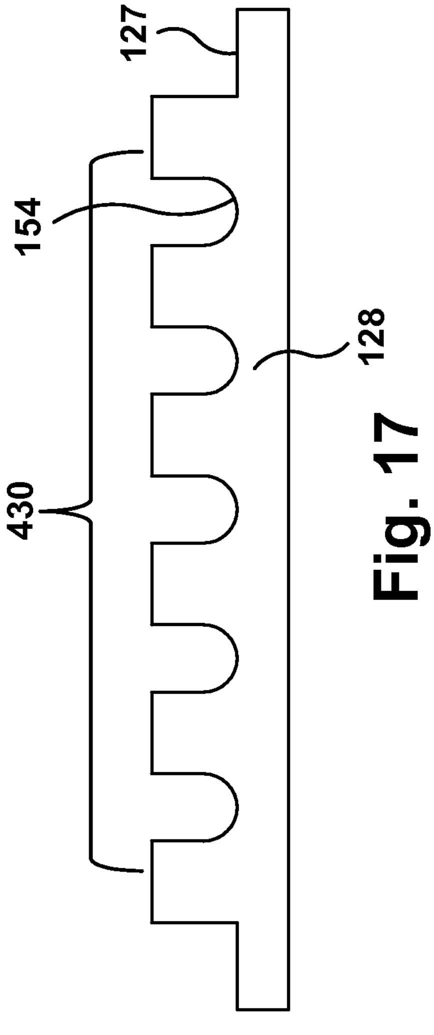

Damper pin 128 is positioned in grooves 126 of adjacent platforms 114 to dampen vibration between adjacent platforms. As illustrated in FIGS. 1, 16 and 17, opposite ends of pins 128 may have shaped sections 127 (omitted for clarity from other figures) for cooperating with corresponding shaped sections along slash face 122 ends to maintain orientation in grooves 126. While shaped sections 127 are illustrated as semi-cylindrical sections with flats, any of a variety of mating shapes may be employed. To accomplish the dampening, damper pin 128 cooperates with the surfaces of platforms 114 defining grooves 126 to provide various configurations of contact between grooves 126 and damper pin 128. Embodiments of the invention provide various damper pin 128 configurations to allow customization of the vibration dampening function of the damper pin.

Figure 4:
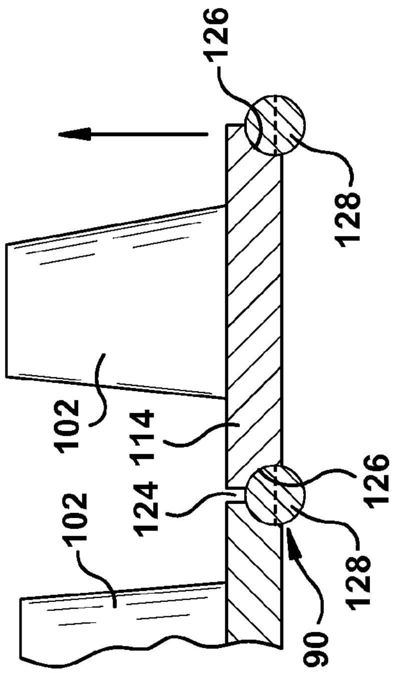
FIG. 4 is a cross-sectional view along line 4-4 in FIG. 1 illustrating a damper pin between adjoining slash faces.
Figure 6:
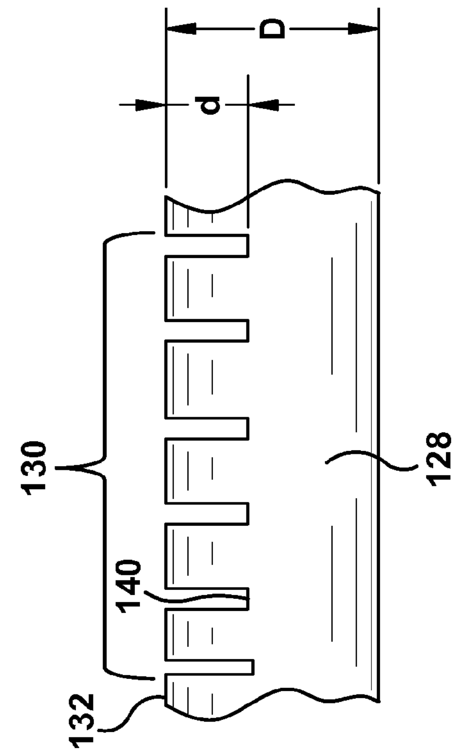
FIG. 6 is a side view illustrating slots in a damper pin for dampening vibrations according to another embodiment.
Figure 5:
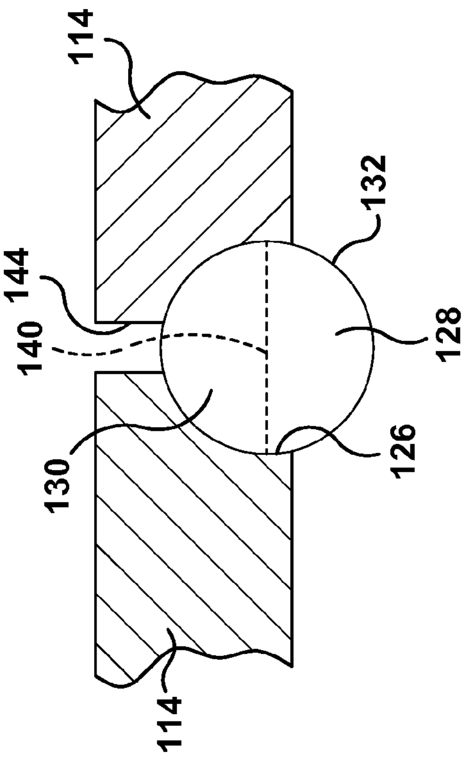
FIG. 5 is an enlarged cross-sectional view illustrating slots in a damper pin for dampening vibrations according to one embodiment.

In one embodiment of the present invention, damper pin 128 includes, as described herein, a pin having a substantially cylindrical-shaped body 129 (FIG. 1) configured for positioning in the opposing grooves 126 (FIG. 4). In addition and in contrast to conventional damper pins, as shown in FIGS. 5-6, damper pin 128 includes a set of slots 130 in an outer surface 132 of the pin and at spaced axial locations therealong. As shown in FIG. 5, set of slots 130 face in a radially outward direction (up on page in all but FIG. 10) relative to turbine bucket platforms 114. As shown by arrow in FIG. 4, a radial outward direction is away from platforms 114 past airfoils 102. In this fashion, set of slots 130 engage grooves 126 in such a way that customization of slots 130 acts to customize the dampening of vibrations. As will be discussed, various arrangement of slots 130 are possible according to embodiments of the invention.

Figure 7:
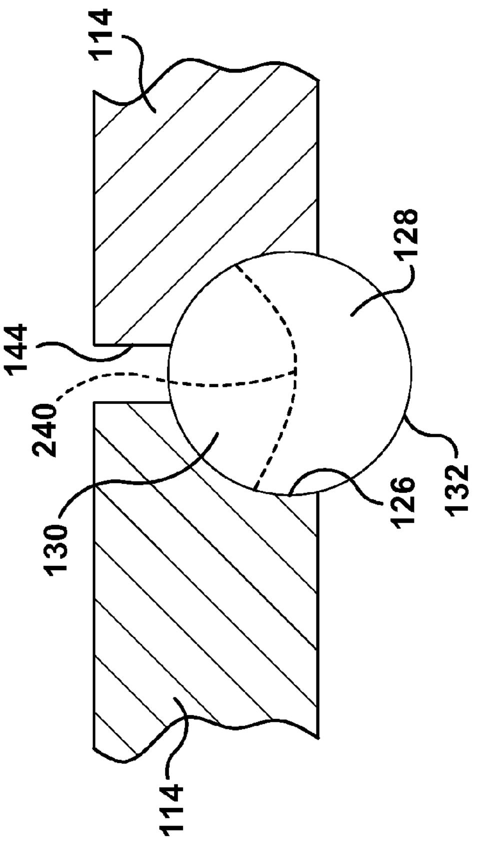
FIG. 7 is an enlarged cross-sectional view illustrating slots in a damper pin for dampening vibrations according to another embodiment.

In some embodiments, shown in FIGS. 5-6 and 8-17, each slot 130 may include an outwardly facing surface 140. In some embodiments, shown in FIGS. 5-6 and 8-17, outwardly facing surface is planar such that outwardly facing surface 140 extends as a chord relative to the substantially cylindrical-shaped pin. Alternatively, as shown in FIG. 7, an outwardly facing surface 240 may be inwardly concave, i.e., inwardly dished or curved in a chordal manner. While outwardly facing surfaces 140, 240 are shown as used separately, they may also be used together on a single pin 128.

Figure 9:
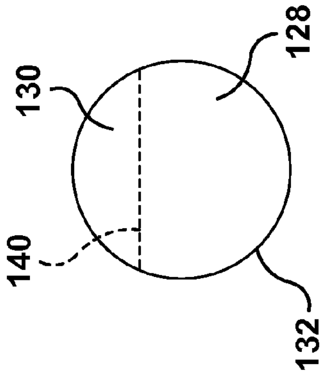
FIGS. 8 and 9 are side and cross-sectional views, respectively, illustrating one embodiment of a damper pin.
Figure 10:
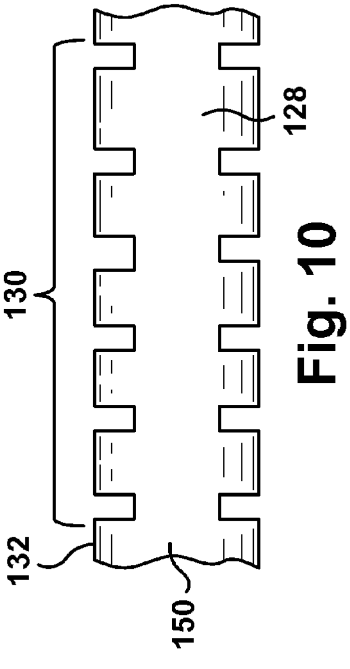

In some embodiments, shown for example in FIGS. 6 and 10, slots 130 may be uniformly spaced along pin 128. That is, a space between each adjacent pins is substantially identical, e.g., +/−0.1 mm. However, in other embodiments, shown for example in FIGS. 8, 12 and 14, slots 130 may be non-uniformly spaced along pin 128. That is, a space between each adjacent slots differs along longitudinal length of pin 128. In any event, the spacing can be user defined to address dampening concerns. In addition, in some embodiments, slots 130 may have uniform depth into pin 128. Slots having uniform depth are shown in the embodiments of FIGS. 5-13, 16 and 17. In an alternative embodiment, shown in FIGS. 14 and 15, at least two slots 230 may have different depths into pin 128. Any number of slots 230 having different depths may be provided and arranged axially in any manner, e.g., two depths alternating, sequenced, all different depths, etc.

Figure 8:
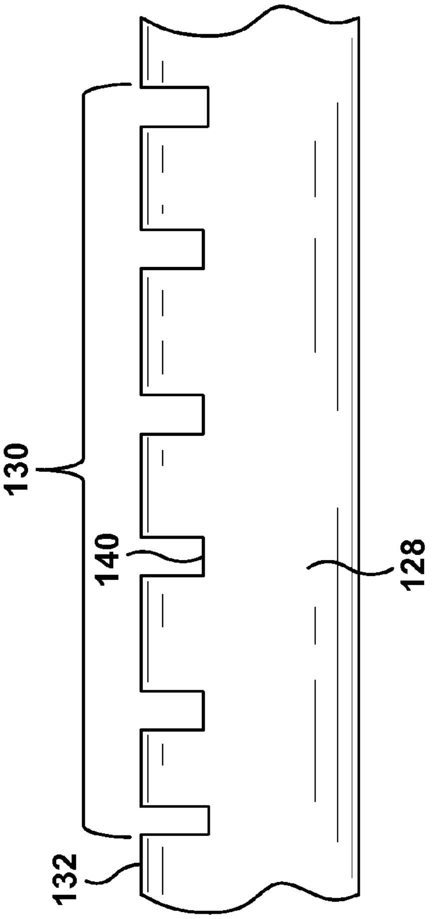
Figure 11:
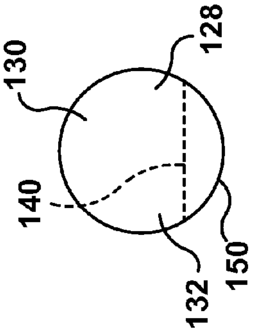
FIGS. 10 and 11 are bottom and cross-sectional views, respectively, illustrating another embodiment of a damper pin.
Figure 13:
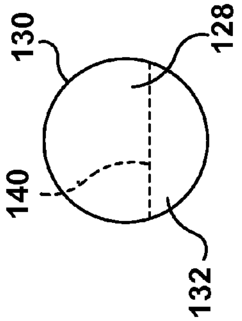
FIGS. 12 and 13 are side and cross-sectional views, respectively, illustrating another embodiment of a damper pin.
Figure 15:
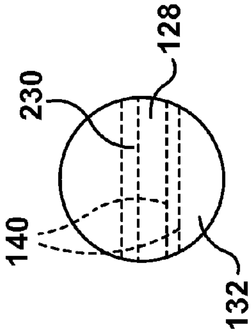
FIGS. 14 and 15 are side and cross-sectional view, respectively, illustrating another embodiment of a damper pin.
Figure 12:
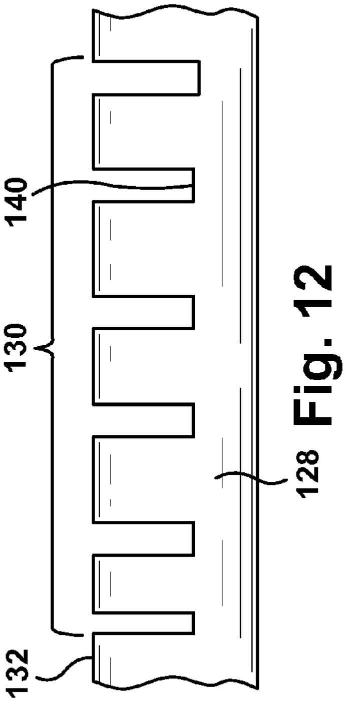
Figure 14:
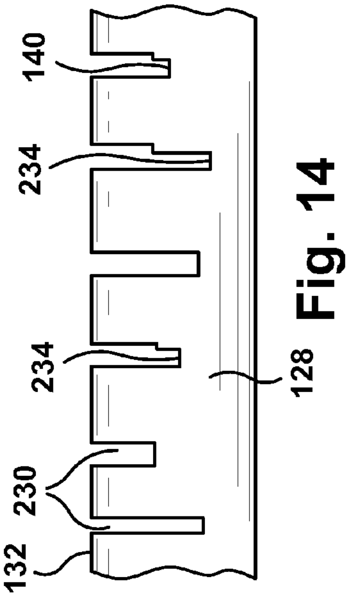

With further regard to depth of the slots, a ratio of an average depth of set of slots 130, 230 to a diameter (d/D in FIG. 6) of the pin may range from approximately 40% to approximately 80%, e.g., +/−1%. Although any percentage within the range is possible, as examples, FIGS. 5-6 show about 45%, FIGS. 8-9 show about 20%, FIG. 11 shows about 80% (note FIG. 10 shows a bottom view as opposed to a side view in FIGS. 12 and 14), FIGS. 12-13 show about 60% and FIGS. 14-15 show slots of varying depth within the stated range. Slots 130 may also be described as extending at about outer surface 132 of pin 128 at different angles. For example, slots 130 may extend from approximately 90° (FIG. 9) to approximately 320° (FIG. 11), e.g., +/−2°. For example, as shown in FIG. 7, each slot 130 may extend approximately 150° about outer surface 132 of pin 128. In FIGS. 10 and 11, each slot 130 extends approximately 320° about the outer surface 132 of pin 128. With regard to the latter case, FIG. 11 shows pin 128 as it would be positioned during operation (see FIGS. 5 and 7) with slots 130 facing in the radially outward direction (up the page) relative to turbine bucket platforms 114 (FIG. 5). Here, a non-slotted remainder 150 of pin 128 faces the radially inward direction (down page in FIG. 11) relative to turbine bucket platforms 114. (In FIG. 10, non-slotted remainder 150 faces the reader.)

In other embodiments, shown in FIG. 16, slots 130 need not have sides that extend perpendicular to an axis of pin 128. For example, as shown in FIG. 16, each slot 330 may have an internal surface 152 that is angled at a non-perpendicular angle to an axis of the pin. The angle can be user defined, e.g., 45° to 60°. In another embodiment, shown in FIG. 17, each slot 430 may have an axially curved bottom surface 154.

Although the various embodiments have been shown in a particular fashion, it is emphasized that any of the above-described versions can be used together. That is, a user can select any part of any of the embodiments and combine them as required to customize the dampening provided by dampening system 100 and dampening pin 128. In any event, system 100 and pin 128 enable more contact area compared to a uniform surfaced pin, which in turn enables very good dampening from pin 128. Dampening pins 128 have been found to be especially effective for un-shrouded buckets where the damper pin may be the only source for dampening. Slots 130 may be machined into new or previously used pins 128. Hence, slots 130 can be easily retrofitted by removing material from existing damper pins to make slots 130.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A damper system for a turbine having adjacent turbine bucket platforms including opposing slash faces having opposing grooves, the system comprising:

a pin having a substantially cylindrical-shaped body configured for positioning in the opposing grooves; and a set of non-circumferential slots in an outer surface of the pin and at spaced axial locations therealong, the set of slots facing in a radially outward direction relative to the turbine bucket platforms.

2. The damper system of claim 1, wherein the set of slots are uniformly spaced along the pin.

3. The damper system of claim 1, wherein the set of slots are non-uniformly spaced along the pin.

4. The damper system of claim 1, wherein the each slot includes an outwardly facing surface, wherein the outwardly facing surface is planar such that the outwardly facing surface extends as a chord relative to the substantially cylindrical-shaped pin.

5. The damper system of claim 1, wherein the set of slots each include an outwardly facing surface, and wherein the outwardly facing surface is inwardly concave.

6. The damper system of claim 1, wherein each slot has an internal surface that is angled at a non-perpendicular angle to an axis of the pin.

7. The damper system of claim 1, wherein each slot has an axially curved bottom surface.

8. The damper system of claim 1, wherein the set of slots include at least two slots having different depths into the pin.

9. The damper system of claim 1, wherein a ratio of an average depth of the set of slots to a diameter of the pin ranges from approximately 40% to approximately 80%.

10. A damper pin for a damper system for a turbine having adjacent turbine bucket platforms having opposing slash faces having opposing grooves, the damper pin comprising:

a substantially cylindrical-shaped body configured for positioning in the opposing grooves; and a set of non-circumferential slots in an outer surface of the body at spaced axial locations therealong, the set of slots facing in a radially outward direction relative to the turbine bucket platforms.

11. The damper pin of claim 10, wherein the set of slots are non-uniformly spaced along the substantially cylindrical-shaped body.

12. The damper pin of claim 10, wherein each slot includes an outwardly facing surface, wherein the outwardly facing surface is planar such that the outwardly facing surface extends as a chord relative to the substantially cylindrical-shaped body.

13. The damper pin of claim 10, wherein each slot includes an outwardly facing surface, and wherein the outwardly facing surface is inwardly concave.

14. The damper pin of claim 10, wherein each slot is angled at a non-perpendicular angle relative to an axis of the substantially cylindrical-shaped body.

15. The damper pin of claim 10, wherein the set of slots face in the radially outward direction relative to the turbine bucket platforms, and a remainder of the pin faces the radially inward direction relative to the turbine bucket platforms.

16. The damper pin of claim 10, further comprising a second set of slots in the outer surface of the substantially cylindrical-shaped body and at spaced axial locations therealong, the second set of slots facing in an opposite direction relative to the set of slots.

17. The damper pin of claim 10, wherein the set of slots include at least two slots having different depths into the substantially cylindrical-shaped body.

18. The damper pin of claim 10, wherein a ratio of an average depth of the set of slots to a diameter of the pin ranges from approximately 40% to approximately 80%.

19. A damper pin for a damper system for a turbine having adjacent turbine bucket platforms having opposing slash faces having opposing grooves, the damper pin comprising:

a substantially cylindrical-shaped body configured for positioning in the opposing grooves; and a set of slots in an outer surface of the body at spaced axial locations therealong, the set of slots facing in a radially outward direction relative to the turbine bucket platforms, wherein the set of slots are non-uniformly spaced along the substantially cylindrical-shaped body.

20. The damper pin of claim 19, wherein each slot includes an outwardly facing surface, wherein the outwardly facing surface is planar such that the outwardly facing surface extends as a chord relative to the substantially cylindrical-shaped body.

21. The damper pin of claim 19, wherein each slot includes an outwardly facing surface, and wherein the outwardly facing surface is inwardly concave.

22. The damper pin of claim 19, wherein each slot has an axially curved bottom surface.

23. The damper pin of claim 19, wherein the set of slots include at least two slots having different depths into the substantially cylindrical-shaped body.

* * * * *